United States Patent
Massoulie et al.

(10) Patent No.: US 9,553,914 B2
(45) Date of Patent: Jan. 24, 2017

(54) REPLICATING DATA

(75) Inventors: Laurent Massoulie, Vaucresson (FR); Efstratios Ioannidis, San Francisco, CA (US); Xia Zhou, Goleta, CA (US)

(73) Assignee: Thomson Licensing, Issy les Moulineaux (FR)

( * ) Notice: Subject to any disclaimer, the term of this patent is extended or adjusted under 35 U.S.C. 154(b) by 303 days.

(21) Appl. No.: 14/006,330

(22) PCT Filed: Aug. 1, 2011

(86) PCT No.: PCT/EP2011/063230
§ 371 (c)(1),
(2), (4) Date: Sep. 20, 2013

(87) PCT Pub. No.: WO2012/126535
PCT Pub. Date: Sep. 27, 2012

(65) Prior Publication Data
US 2014/0012956 A1  Jan. 9, 2014

(30) Foreign Application Priority Data
Mar. 21, 2011 (EP) .................................. 11305313

(51) Int. Cl.
*G06F 17/30* (2006.01)
*H04L 29/08* (2006.01)
(Continued)

(52) U.S. Cl.
CPC ......... *H04L 67/02* (2013.01); *G06F 17/30206* (2013.01); *G06F 17/30209* (2013.01);
(Continued)

(58) Field of Classification Search
CPC ................ H04L 67/1095; H04L 67/104; G06F 17/3206; G06F 17/3209; G06F 17/30206; G06F 17/30209
See application file for complete search history.

(56) References Cited

U.S. PATENT DOCUMENTS 6,256,675 B1 * 7/2001 Rabinovich ............. H04L 29/06
  709/225
7,752,168 B2   7/2010 Sudhakar
(Continued)

FOREIGN PATENT DOCUMENTS

CN   aN101883092   11/2010
EP      2249545     11/2010
(Continued)

OTHER PUBLICATIONS

Search Rept:Oct. 7, 2011.
(Continued)

*Primary Examiner* — Aaron Strange
(74) *Attorney, Agent, or Firm* — Robert D. Shedd; Jerome G. Schaefer

(57) ABSTRACT

The present invention concerns the replication of data, in particular the replication of data in a peer-to-peer network of mobile devices. Each device stores a plurality of data items. When two devices come into range, a decision as to whether to replicate a data item is made in dependence the extent to which that data item has been requested by other devices, and (b) the extent to which that data item is replicated on other devices. In this way, both the demand and supply of a data item are taken into account.

16 Claims, 1 Drawing Sheet

(51) Int. Cl.
*H04W 4/00* (2009.01)
*H04W 8/00* (2009.01)
*H04W 84/18* (2009.01)

(52) U.S. Cl.
CPC ........ *H04L 67/104* (2013.01); *H04L 67/1095* (2013.01); *H04W 4/008* (2013.01); *H04W 8/005* (2013.01); *H04W 84/18* (2013.01)

(56) References Cited

U.S. PATENT DOCUMENTS

| | | | |
|---|---|---|---|
| 7,769,009 B1 | 8/2010 | Katzer et al. | |
| 7,783,777 B1* | 8/2010 | Pabla ................ | G06F 17/30206 709/238 |
| 7,885,928 B2* | 2/2011 | Harrington ....... | G06F 17/30206 707/637 |
| 8,346,824 B1* | 1/2013 | Lyle .................. | G06F 17/30206 707/822 |
| 8,856,327 B2 | 10/2014 | Chaintreau et al. | |
| 8,886,705 B1* | 11/2014 | Tewari .............. | G06F 17/30209 709/203 |
| 9,015,342 B2* | 4/2015 | Ni ........................... | H04L 45/64 709/223 |
| 9,106,668 B2* | 8/2015 | Chalouhi ............. | H04L 67/104 |
| 2003/0172089 A1* | 9/2003 | Douceur ........... | G06F 17/30067 |
| 2008/0027897 A1 | 1/2008 | Ushiyama et al. | |
| 2008/0177767 A1 | 7/2008 | Lin et al. | |
| 2008/0215663 A1 | 9/2008 | Ushiyama | |
| 2010/0188689 A1* | 7/2010 | Gnanasambandam | G03G 15/5075 358/1.15 |
| 2010/0223232 A1 | 9/2010 | Wakefield | |
| 2010/0274765 A1 | 10/2010 | Murphy et al. | |
| 2011/0010434 A1 | 1/2011 | Eleftheriou et al. | |

FOREIGN PATENT DOCUMENTS

| | | |
|---|---|---|
| EP | 2252035 | 11/2010 |
| JP | 2006155486 | 6/2006 |
| JP | 2006277337 | 10/2006 |
| JP | 2007148545 | 6/2007 |
| JP | 2007305025 | 11/2007 |
| JP | 2009217602 | 9/2009 |
| JP | 2010262656 | 11/2010 |
| JP | 2011010281 | 1/2011 |

OTHER PUBLICATIONS

Gao et al_Proactive Replication and Search for Rare Objects in Unstructured Peer-to-Peer Networks, WAIM Jan. 1, 2010, LNCS, pp. 74-85, Springer, Berlin.
Zhou Xia, "On the Stability and optimality of universal swarms", Stratis Ioannidis , Laurent Massoulié Newsletter ACM SIGMETRICS Performance Evaluation Review—Performance evaluation review archive vol. 39 Issue 1, Jun. 2011 pp. 301-312.
Altman et al., "Distributed storage management of evolving files in delay tolerant ad hoc networks" In INFOCOM (2009), pp. 1431-1439.
Altman et al., "Decentralized stochastic control of delay tolerant networks" In INFOCOM (2009), pp. 1134-1142.
Boyd et al., "Convex Optimization" Cambridge University Press, 2004.
Chaintreau et al., "The age of gossip: spatial mean field regime" In SIGMETRICS (2009), pp. 109-120. Jun. 15-19, 2009.
Cohen et al., "Strategies in unstructured peer-to-peer networks" SIGCOMM Computer Communication Rev. 32 (2002), 177-190, Aug. 19-23, 2002.
Hajek et al., "The missing piece syndrome in peer-to-peer communication" Information Theory Proceedings, 2010 IEEE International Symposium on Jun. 13-18, 2010, 1748-1752.
Hu et al., "Optimal channel choice for collaborative ad-hoc dissemination" In INFOCOM 2010.
Ioannidis et al., "Optimal and scalable distribution of content updates over a mobile social network" In IEEE INFOCOM 2009.
Ioannidis et al., "Distributed caching over heterogeneous mobile networks" In SIGMETRICS, pp. 311-322, Jun. 14-18, 2010.
Massoulie et al.,"Structural properties of proportional fairness: Stability and insensitivity" The Annals of Applied Probability 17, N° 3 809-839, 2007.
Massoulie et al., "Rate-optimal schemes for peer-to-peer live streaming" Perform. Eval. 65 , 804-822, Nov. 2008.
Qiu et al "Modeling and performance analysis of BitTorrent-like peer-to-peer networks" SIGCOMM Comput. Commun. Rev. 34, pp. 367-378, Aug. 30-Sep. 3, 2004.
Reich et al., "The age of impatience: optimal replication schemes for opportunistic networks" In Co Next, pp. 85-96, Dec. 1-4, 2009.
Massoulie et al., "Coupon replication systems" Networking, IEEE/ACM Transactions on 16, n° 3, pp. 603-616, Jun. 2008.
Doulamis, Nikolaos, et al; Cluster Based Proactive Replication of Multimedia Files in Peer-to-Peer Networks; Proceedings of the Second IEEE International Conference on Digital Information Management; Jan. 1, 2007.
Rajasekhar, S., et al; Load Sharing in Peer-to-Peer Networks Using Dynamic Replication; IEEE Proceedings of the 20th International Conference on Advanced Information Networking and Applications (AINA '06); Jan. 1, 2006.
Liu, Yong, et al; Biased Random Walk-Based Replication and Search; Editorial Board of the Journal of Communications, vol. 30, No. 12; Dec. 1, 2009.
Rathore, Kumar, et al; Adaptive Searching and Replication of Images in Mobile Hierarchical Peer-to-Peer Networks; Science Direct; Elsevier Science; Jan. 1, 2007.

\* cited by examiner

REPLICATING DATA

This application claims the benefit, under 35 U.S.C. §365 of International Application PCT/EP2011/063230, filed Aug. 1, 2011, which was published in accordance with PCT Article 21(2) on Sep. 27, 2012 in English and which claims the benefit of European patent application No. 11305313.6, tiled Mar. 21, 2011.

The present invention concerns the replication of data, in particular the replication of data in a peer-to-peer network.

In peer-to-peer networks, such as opportunistic networks of mobile devices, the devices come into communication contact with one another when two users carrying the devices move into range. When this occurs, the devices may copy items of data to another. The more widely a data item is replicated, that is, the greater the number of devices that hold a data item, the more likely that data item will be available when required by another device in range. Thus, one the one hand, it can be helpful to have data widely replicated on the one hand since it is then easier to access. However on the other hand, memory is a limited resource.

Hence the decision to copy or otherwise transfer data when two devices come into range can be an important one.

According to one aspect of the present invention, there is provided a method of replicating data in a peer-to-peer network including a plurality of mobile devices, each device storing a plurality of data items, the method including the steps of: forming a connection between a first device and a second device; and transmitting a copy of a data item stored on the first device to the second device in dependence on (a) the extent to which that data item is requested on other devices, and (b) the extent to which that data item is replicated on other devices.

Because the transmission is dependent on both (a) the extent to which that data item is requested on other devices, and (b) the extent to which that data item is replicated on other devices, a balance is achieved between the need to replicate data widely and the need to conserve memory.

According to another aspect of the present invention, there is provided 14 a mobile device comprising: a processor facility for processing data; a memory for storing a plurality of data items; and, a transmission stage for transmitting and receiving data items, the processing stage being arranged to perform a transmission decision of a data item in dependence on an indication of (a) the extent to which that data item is requested on other devices, and (b) the extent to which that data item is replicated on other devices.

The invention will now be described, by way of example only, and with reference to the following drawings in which.

Figure 1:
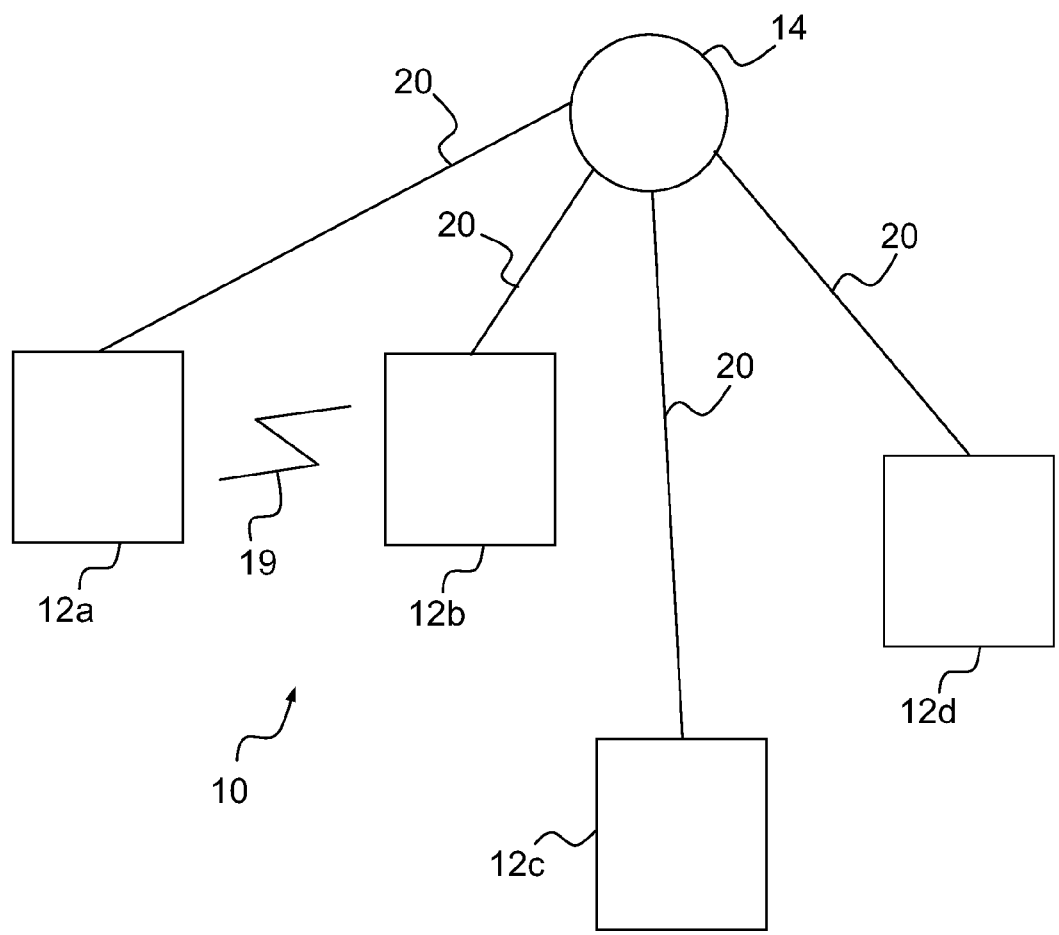
FIG. 1 shows a communication system 10 according to the present invention.
Figure 2:
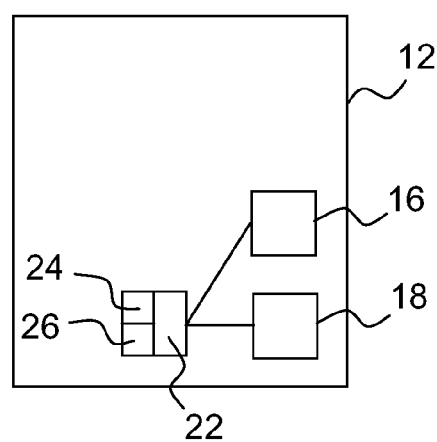
FIG. 2 shows a mobile device.

FIG. 1 shows a communication system 10 comprising a plurality of mobile devices 12a,12b,12c,12d and a tracker server 14. One of the mobile devices 12 is shown in more detail in FIG. 2. The mobile devices 12 are each equipped with a short range module 16 to communicate in a short range wireless mode, for example using the Bluetooth protocol. Each device also has a long range module 18 for communicating in long range wireless mode with one of a plurality of base stations of a wired network (not shown), using GSM for example, so as to form a respective communication channel 20 between the tracker server 14 and each device. Typically, the mobile devices will be hand held devices with telephony functionality. The wired network may be part of the Internet.

The mobile devices can communicate indirectly with one another through the wired network using their long range modules 18. However, when in range of one another the mobile devices can also communicate directly with each other in the short range mode over a short range wireless link 19, the range being typically a few meters, normally less than 10 m. Because the mobile devices are carried about by their respective users, different devices move in and out of range of one another such that, at a network level, the connections between devices change with time in the manner that can appear random, uncertain or at least difficult to predict. That is, connections between devices are formed in an ad hoc manner.

When two mobile devices move into range of one another, that is, come into contact, each can exchange data in an opportunistic manner with the other: that is, each device can make use of the opportunity provided by the proximity of the other device. In this way, the mobile devices can be viewed as forming an opportunistic network or an ad hoc network, each device acting as peer in the network.

Returning to FIG. 2, each mobile device 12 has a data processing stage 22 that is operatively connected to the long and short range modules 16,18 in order to process data received therefrom and to prepare data for transmission. The data processing stage has a processor facility 24 as well as a memory 26 for respectively performing operations and storing data including content data.

In the long-range mode, each mobile device may connect to the Internet through a base station. Within the Internet, there are located one or more servers (not shown) from which the mobile devices can access content. (Alternatively or in addition, the mobile devices may have an additional mode of communication such as an Ethernet or other electrical connection, or another wireless mode such as WiFi for connecting to the Internet). Users can thus download content such as multimedia data (e.g., a program comprising video data, audio data or both) from the Internet in long-range mode and subsequently pass the content among themselves in an opportunistic manner using short range communication.

Considering the communication system 10 as an opportunistic network formed by the mobile devices communicating amongst themselves, there may be situations in which a given device (or a user thereof) wishes to retrieve a particular file. Clearly, the greater the number of other devices storing the file, the greater the likelihood of the given device coming into contact with another device storing that file. Consequently, on average, the time needed for the given device to be able to retrieve a file is reduced if copies of that file are stored on many of the devices. However, because of the finite nature of memory, replicating or storing a file on many different devices means that there will less space left for storing other files.

Furthermore, is possible that some files will be under replicated, that is, that demand for these files exceeds their supply (as represented by the extent of replication for these files). Conversely, it is possible that other files will be over replicated, that is, that supply exceeds demand.

In one embodiment, the supply versus demand is monitored for each file by keeping track of the demand (requests for each files) and the supply—that is the number of copies of files stored in the system. This may be done in a centralized way at the tracker server 14 or in a distributed fashion at each device 12. The supply relative to demand is represented by a transfer value. When the transfer value is equal to zero, this is considered to be the neutral point. When the transfer value is positive, it is considered that a file is under replicated or rare, whilst a negative value indicated over replication. The transfer value, also referred to herein as an "excess request value", can be viewed as an indication of the excess of requests in relation to the replication of a file.

The decision as to whether to transfer or copy a file from one device to another made in dependence on this transfer value, or, equivalently, on the basis of supply versus demand. Because the transfer value of a data file is representative of the demand versus supply of that file, the use of transfer values when determining whether an files should be copied, that is transmitted from one device to another, tends to cause, on average, files that are under replicated to be more replicated, and files that are over replicated to be less replicated.

In addition, because the number of copies of a given data file in the system is monitored, for example with a counter device, the entry and exit of devices holding a file to and from the system can be taken into account, for example by incrementing or decrementing a counter value.

Figure 3:
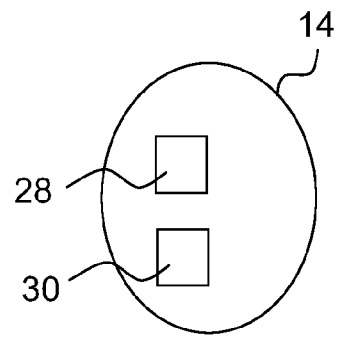
FIG. 3 shows a tracker server.

The tracker server 14 is show in more detail in FIG. 3. The tracker server 14 a processor 28 and a memory 30 for respectively processing and storing data. The tracker server is arranged to keep in memory a table in which each file stored in the system has associated therewith an ID that is mapped to both (i) a replication value indicative of the number of devices holding copies of that file and (ii) a request value indicative of the number of requests that have been made for that file.

In a one embodiment, when a mobile device requests a given file from another mobile device, the requesting mobile device transmits a request update message to the tracker server over the communication channel 20. In response, the tracker server updates the request value for that file by incrementing the value by one. Likewise, when a device receives a file copy from another device, the receiving mobile device transmits a replication update message to the tracker server, in response to which the tracker server updates the replication value for the file that has been copied by incrementing the request value by one. Similarly, if a mobile device deletes a file an update message is transmitted to the tracker server allowing the tracker server to decrement the replication value for that file. A mobile device entering the system is arranged to transmit an update message informing the tracker server of the files it is storing, in response to which the tracker server increments the replication value for each of the files.

In this way, the replication values for each file can be seen as individual counters that are incremented or decremented depending whether a file is copied or deleted. The request value for each file can also be viewed as a counter that is incremented each time a request is made, the request value being re-set at intervals.

The following illustrates a situation in which two mobile devices referred to hereinafter as device A and device B are in communication contact over a short range link. Device A has files stored in its memory labeled u, v, and w respectively stored in its memory. Device A seeks to obtain file z. Device B has files labeled w, x, and y and seeks to obtain file u. The tracker server maintains for each file u, v, w, x, y, z estimates of respective replication values $p\_u, p\_v, \ldots, p\_z$ and respective request values $q\_u, q\_v, \ldots, q\_z$ in the manner indicated above. The tracker broadcast the current frequency values and the current replication values in its table. Values corresponding to the file or files a mobile device is holding are captured by that device and loaded into memory for use in making file copy or replace decisions.

When devices A and B come into contact, the followings steps are performed.

Device A checks (by transmitting a message to device B to determine) whether device B is able to provide the desired file, that is, file z. Since device B does not have file z, it returns a negative response, and device A performs the following further steps.

Device A computes the excess requests of each file, this quantity being given by $excess\_u = q\_u - K \cdot p\_u$, $excess\_v = q\_v - K \cdot p\_v$, ... for all files, where K is the nominal cache size, here 3.

Device A then identifies whether there are files that device B can provide which have a higher excess request level than one of the files that device A currently holds.

In the present example, among the files that device B holds, file y is the one with the largest excess (excess_y>excess_w and >excess_x). File u is the one with the smallest excess among the files that device A holds (excess_u<excess_v and <excess_w). Device A is arranged to obtain file y from B, and put it in its memory in place of file u, if and only if excess_y>excess_u.

If device A did not have the file device B requests, device B would follows the same logic as that explained above in relation to device A. However, since device A does have the file B requests, B simply downloads file u and leaves the system, without necessarily updating its related replication values or do any other cache update except for dumping an arbitrary file so as to free space for acquiring desired file u.

Subsequently, the devices A and B transmit the relevant update messages to the tracker server indicating which files have been requested and which files have been copied so that the tracker server can update its replication and request values for each file transferred and requested.

In a second embodiment, rather than the request values and replication values being held and updated centrally, individual devices maintain their own estimates for the request and replication values of their files. Thus instead of the tracker server maintaining replication values $p\_u, p\_v, \ldots, p\_z$ and request values $q\_u, q\_v, \ldots, q\_z$, device A will maintain its estimates of these values. That is, for all files u, v, w, x, y, z device A maintains in its memory estimates $p\_u(A), p\_v(A), \ldots, p\_z(A)$ of their replication value, and $q\_u(A), q\_v(A), \ldots, q\_z(A)$ of their request value. Likewise, for all files u, v, w, x, y, z device B maintains in its memory estimates $p\_u(B), p\_v(B), \ldots, p\_z(B)$ of their replication value, and $q\_u(B), q\_v(B), \ldots, q\_z(B)$ of their request value.

The steps performed by devices A and B when determining whether to copy a file are the essentially the same as those performed in the first embodiment. However, when device A computes the excess requests for each item, this is done using the estimates maintained by device A rather than values from the tracker server. Likewise, if device B computes the excess requests for each item, this is done using the estimates maintained by device B.

In addition, after having put in memory file y in place of u, device A will update its estimates: for example: $p\_u(A) = p\_u(A) + r(0 - p\_u(A))$ where r is a predefined parameter, and a 0 is introduced since the encountered device B does not have item u, ... $p\_w(A) = p\_w(A) + r(1 - p\_w(A))$, where an additive term 1 is introduced since encountered user B has item w, and similar updates are performed for the request rates.

Although the above description refers to the transfer of file, other data entities may be transferred in the same manner; that is, the same considerations may be applied to other data entities such as packets, objects, or data chunks.

A file may contain audio visual data, that is, content, such as a film. However, a file may be an image, a audio data, or other data.

In one embodiment, estimates are used to assess how many users are storing a given data item and how many users requesting it. In one embodiment the mobile devices each report this information periodically to the tracker server (when they enter or leave the system or when they change their contents). The server thus is able to keep track of these values, reducing the need for these to be estimated.

In another embodiment, the server periodically contacts/samples a small fraction of all nodes, that is, the mobile devices (say 1-10%) and asks what they store and what they request. This gives the tracker server an estimate of the real values.

The tracker makes these publicly available to users, who can contact the server and learn this information whenever they need to.

In summary, the following additional comments are provided: we consider a scenario each which each wishes to obtain content stored by some other mobile users, i.e., a so-called mobile peer-to-peer system. One way to retrieve this content is by encountering another user that stores it, and retrieving it through a wireless transfer (e.g., via WiFi or Bluetooth). Mobile users may immediately exit the system when they retrieve the content that they are interested in.

When two users encounter each other, but none of them stores the content the other user is interested in, these users can nonetheless choose to exchange some of the content that they presently store. They can do this with the purpose of increasing the number of replicas of a content item that is rare, thereby allowing other users to retrieve it quickly.

This gives rise to the following issues: which content items are rare and which content items are abundant in the system, and how should such information be used to determine how mobile users should exchange content when they encounter each other opportunistically.

In particular, the present system seeks to specify (a) a method for identifying which items in the system are "rare" and (b) a method for using this information to guide how mobile users should replicate content they store when they encounter other mobile users.

Our system includes a device or module that keeps track of (a) how many users are presently requesting a given content item and (b) how many users are storing this item. We call this device the "tracker". The tracker uses this information to associate a numerical value with every item requested by users presently in the system. A positive numerical value indicates that the item is "under-replicated" or "rare". A negative numerical value indicates that the item is "over-replicated" or "abundant". The numerical values are broadcast by the tracker to the mobile users. The mobile users subsequently use these values to determine whether, upon an encounter, they should replace one of the items they store with an item retrieved by the user they meet, or (vice-versa), transmit one of their items to the other user.

As can be seen from the above, the present embodiments concern the replication of data, in particular the replication of data in a peer-to-peer network of mobile devices. Each device stores a plurality of data items. When two devices come into range, a decision as to whether to replicate a data item is made in dependence the extent to which that data item has been requested by other devices, and (b) the extent to which that data item is replicated on other devices. In this way, both the demand and supply of a data item are considered.

The invention claimed is:

1. A method of replicating data in a peer-to-peer network including a plurality of devices each device comprising a memory, each device storing a plurality of data items, the method comprising, at a first device:
    checking whether a second device is able to provide a data item desired by the first device;
    when the second device does not have the desired data item, computing a transfer value for each data item;
    identifying whether there are one or more data items that the second device can provide, which have a higher transfer value than one of the data items that the first device currently holds, each transfer value of a data item being determined by:
        (a) the extent to which that data item is requested on other devices, and
        (b) the extent to which that data item is replicated on other devices;
    transmitting, to the memory of the first device, a copy of a data item stored on the second device and having the largest transfer value;
    wherein the method exchanges multimedia data for use by other peer-to-peer network devices.

2. The method of claim 1, wherein the first device is configured to:
    obtain the data item having the largest transfer value from the second device; and
    replace a data item stored in the first device, having the lowest transfer value, by said obtained data item, if and only if the transfer value of the obtained data item is higher than the transfer value of the data item stored in first device.

3. The method of claim 1, wherein the value is a scalar quantity.

4. The method of claim 1, wherein the transfer value for a given data item is dependent on a measure of the difference between the extent of the requests for the data item and the extent of the replication of the data item.

5. The method of claim 1, wherein the extent to which the data item is requested on other devices is determined by the number of requests for the data item.

6. The method of claim 1, wherein the extent to which the data item is replicated on other devices is determined by the number of devices holding a copy of the data item.

7. The method of claim 1, wherein the number of copies of the data item in the network is monitored, and wherein the number is updated when a device with the data item enters or leaves the network.

8. The method of claim 7, where a counter is incremented or decremented each time a device with that data item respectively enters or leaves the network.

9. The method of claim 1, wherein the devices are able to form temporary connections with one another.

10. A first device comprising:
    a processor facility for processing data;
    a memory for storing a plurality of data items; and
    a transmission stage for transmitting and receiving data items, wherein the processor is configured to:
    check whether a second device is able to provide a data item desired by the first device;
    when the second device does not have the desired data item, computer a transfer value for each data item;
    identify whether there are one or more data items that the second device can provide which have a higher transfer value than one of the data items that the first device currently holds, each transfer value being determined by:

a) the extent to which the data item is requested on other devices, and
b) the extent to which the data item is replicated on other devices;

transmit, to the first device, a copy of a data item stored on the second device and having the largest transfer value;

wherein the processor acts to exchange multimedia data for use by other peer-to-peer network devices.

11. The device as of claim 10, wherein the processor is further configured to:

obtain the data item having the largest transfer value from the second device; and replace a data item having the lowest transfer value, stored in the first device, by said obtained data item, if and only if the transfer value of the obtained data item is higher than the transfer value of the data item stored in first device.

12. The device as of claim 10, wherein the transfer value is a scalar quantity.

13. The device as of claim 10, wherein the transfer value for a given data item is dependent on a measure of the difference between the extent of the requests for that data item and the extent of the replication of that data item.

14. The device as of claim 10, wherein the extent to which a data item is requested on other devices is determined by the number of requests for that data item.

15. The device as of claim 10, wherein the extent to which a data item is replicated on other devices is determined by the number of devices holding a copy of that data item.

16. The device as of claim 10, wherein the number of copies of a data item in the network is monitored, and wherein the number is updated when a device with that data item enters or leaves the network.

* * * * *